US009364843B2

(12) United States Patent
Glispy

(10) Patent No.: US 9,364,843 B2
(45) Date of Patent: Jun. 14, 2016

(54) WIRELESSLY DEPLOYABLE MARKER FLAG SYSTEM

(71) Applicant: Vincent Glispy, West Valley City, UT (US)

(72) Inventor: Vincent Glispy, West Valley City, UT (US)

( * ) Notice: Subject to any disclaimer, the term of this patent is extended or adjusted under 35 U.S.C. 154(b) by 55 days.

(21) Appl. No.: 14/547,818

(22) Filed: Nov. 19, 2014

(65) Prior Publication Data

US 2015/0137957 A1 May 21, 2015

Related U.S. Application Data

(60) Provisional application No. 61/906,094, filed on Nov. 19, 2013.

(51) Int. Cl.

| | |
|---|---|
| ***G05B 11/01*** | (2006.01) |
| ***G08C 19/16*** | (2006.01) |
| ***B05B 15/00*** | (2006.01) |
| ***G08C 17/02*** | (2006.01) |

(52) U.S. Cl.

CPC .............. *B05B 15/001* (2013.01); *G08C 17/02* (2013.01)

(58) Field of Classification Search

CPC .............................. B05B 15/001; G08C 17/02
USPC ......................................................... 340/12.5
See application file for complete search history.

(56) References Cited

U.S. PATENT DOCUMENTS

| | | | | |
|---|---|---|---|---|
| 5,524,824 | A | 6/1996 | Frimmer | |
| 5,992,760 | A * | 11/1999 | Kearby | B05B 1/3006 239/200 |
| 6,488,218 | B1 | 12/2002 | Townsend | |
| 6,732,946 | B2 | 5/2004 | Veazie | |
| 7,946,507 | B2 | 5/2011 | Gauthier, III | |
| 8,181,889 | B2 * | 5/2012 | Shahak | B05B 3/021 239/203 |

* cited by examiner

*Primary Examiner* — Nader Bolourchi

(74) *Attorney, Agent, or Firm* — Daniel Baudwin; Global Intellectual Property Agency, LLC

(57) ABSTRACT

A wirelessly deployable marker system is provided that allows a user to remotely activate one or more marker flags from individual marker flag assemblies when marking the location of landmarks and obstacles on a lawn. Each marker assembly comprises an elongated marker flag supported by a housing and spring-biased within the housing to elevate the marker into a deployed state. A solenoid latch secures the marker flag within the housing when pressed thereinto, while a wireless transmitter is used to activate the solenoid and therefore release the marker flag from the housing. The solenoid latch engages the marker flag when the flag is within the housing, and allows a spring to elevate the marker flag from the housing when the solenoid latch is withdrawn from the flag. In this way, the flag is remotely deployable, and thereafter can be inserted into the housing manually by the user.

3 Claims, 3 Drawing Sheets

WIRELESSLY DEPLOYABLE MARKER FLAG SYSTEM

CROSS REFERENCE TO RELATED APPLICATION

This application claims the benefit of U.S. Provisional Application No. 61/906,094 filed on Nov. 19, 2013. The above identified patent application is herein incorporated by reference in its entirety to provide continuity of disclosure.

BACKGROUND OF THE INVENTION

1. Field of the Invention

The present invention relates to lawn marking flags and sprinkler systems. More specifically, the present invention relates to a deployable marking flag for a sprinkler head that is wirelessly deployed to mark the location of the sprinkler prior to landscaping activities.

Prior to landscaping activities, it is customary to survey the area to be landscaped and find any obstacles or structures that may interfere with mowing, trimming, and other landscaping activities. These include exposed vent pipes, large rocks and shrubbery, as well as lawn sprinkler heads. Sprinkler heads are generally deployed throughout a yard if an in ground sprinkler system is installed on the property. The sprinkler heads are usually recessed within a housing below ground, but still pose a danger of damage to landscaping equipment, or a danger of being damaged themselves, if not properly located and marked prior to mowing or aerating the lawn.

For larger properties with sprinkler systems, it is common to mark the locations of the sprinkler heads prior to mowing, aerating, or power raking the lawn. Traditionally this meant that one must survey the property and plant small flags adjacent to the sprinkler heads to mark their location. During the landscaping activity, the user can visualize the locations of the sprinkler heads by the flags and avoid the obstacle. While the process of marking sprinkler heads with flags is effective and well understood, the process of surveying the property and manually deploying the flags is time consuming and involves additional work for the property owner or landscaper. The manual process may also require the effort of two individuals instead of one individual.

To forego the process of marking sprinkler heads increases the risk of damage to the sprinkler system and to landscaping equipment, which is unacceptable. However, given the time required to deploy temporary flags, and the risk of permanent flags being removed or dislodged over time, there exists a need for an improved means of marking lawn obstruction locations. These obstructions include sprinkler head locations, but also include electrical utility boxes, exposed vent pipes, exposed rocks, and other items that can be damaged and cause damage to lawn equipment if not avoided by the landscaper.

The present invention pertains to a new method of deploying marker flags adjacent to sensitive structures on lawns and in other environments, whereby a wirelessly activated flag is provided that does not require manual deployment. The system comprises a spring biased flag marker that is positioned within a tubular member and biased to elevate into a deployed state. A solenoid latch is provided that secures that flag in a stowed state prior to deployment. The solenoid switch is activated by current from a control circuit, which receives signals from a wireless transmitter to activate the solenoid and thereby release the marker flag. The marker flags deploy in an elevated state, and can be pressed back into the tubular member and stowed using a manual process, whereby a user steps onto the flag marker or otherwise presses it downward such that the solenoid latch secures the flag marker in the stowed state. In this manner, deployment is wirelessly controlled, and optional stowage is a manual process.

2. Description of the Prior Art

Devices have been disclosed in the prior art that relate to marker flag systems and sprinkler heads. These include devices that have been patented and published in patent application publications. These devices generally relate to unique sprinkler head configurations and devices that mark the same that do not share the same elements or method of operation as disclosed herein. The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 7,946,507 to Gauthier, III, which discloses a sprinkler head location indicator that comprises an annular collar that is secured to a sprinkler head shaft. The collar includes radially-extending guidelines that allow the device to be severed into sections, thereby accommodating sprinkler heads of different size therethrough. The Gauthier, III discloses a frangible structure that can accommodate sprinkler heads of different size and configuration; however the device is a static marker that fails to contemplate an activation system that can move the indicator between an active position and a stowed state.

U.S. Pat. No. 6,732,946 to Veazie discloses a lawn irrigation sprinkler that allows for in-situ repair and indicates when the nozzle has become damaged or dislodged. An alert device telescopically extends from the device using the potential energy of a coil spring disposed within the hollow housing of the device. When the nozzle is partially or completely dislodged, the coil spring biases a shutoff valve that cases the alert device to extend upwards, thereby indicating a faulty sprinkler head. While the Veazie device provides an indicator for lawn sprinklers, its ability to activate is dependent upon damage or malfunction of the sprinkler itself. The present invention operates using a remote radio signal, which activates a solenoid to raise a signal for each sprinkler head.

Similar to the Gauthier, III device, U.S. Pat. No. 5,524,824 to Frimmer discloses a shut-off valve for a sprinkler head that includes a spring biased valve element that is biased toward the valve seat. Water is diverted using the valve into a perforated tube when the sprinkler head becomes dislodges from the riser pipe, whereby the perforated tube extends upwards to indicate a damaged or malfunctioning sprinkler head. As with the Gauthier, III device, the Frimmer device utilizes diverted water flow to extend an alert signal to owners. The present invention is not directed to a device that indicates malfunctioning sprinkler heads, but rather one that can be used to indicate positioning of each sprinkler head upon command, wherein a remote-activated system raises an indicator member for visual indication of each sprinkler.

The present invention provides a wirelessly deployable marker system that utilizes a spring-biased marker and a solenoid latch to deploy the marker. The system is useful for marking objects along a lawn (e.g. sprinkler heads), but furthermore contemplates application outside of landscaping. The system includes a wireless transmitter and receiver, a power source, a solenoid latch, and a spring-biased marker assembly. It is submitted that the present invention substantially diverges in elements from the prior art, and consequently it is clear that there is a need in the art for an improvement to existing marker systems. In this regard the instant invention substantially fulfills these needs.

SUMMARY OF THE INVENTION

In view of the foregoing disadvantages inherent in the known types of marker systems now present in the prior art, the present invention provides a new system in which the user can wirelessly deploy one or more marker flags from individual marker assemblies without manually deploying the same.

It is therefore an object of the present invention to provide a new and improved marker system that has all of the advantages of the prior art and none of the disadvantages.

It is another object of the present invention to provide a marker system that is wirelessly deployable from a distance, whereby a user can remotely activate the system to release a marker flag when desired.

Another object of the present invention is to provide a marker system that is manually replaceable into a stowed state.

Yet another object of the present invention is to provide a marker system that comprises a spring-biased marker flag assembly that is released using a solenoid latch, whereby the assembly can be a standalone assembly, or one that is integrated into the housing of another assembly (i.e. a sprinkler housing or the like).

Another object of the present invention is to provide a marker system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
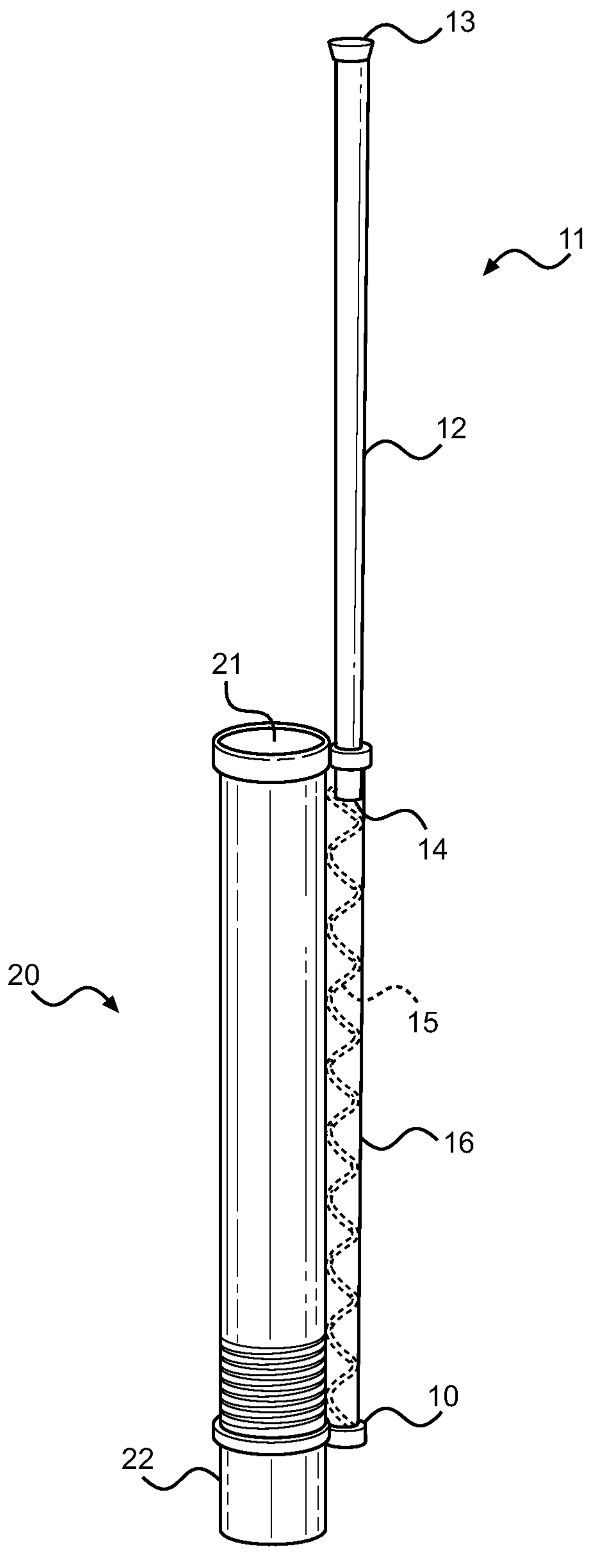
FIG. 1 shows a perspective view of the marker assembly of the present invention in a deployed state.

Reference is made herein to the attached drawings. Like reference numerals are used throughout the drawings to depict like or similar elements of the marker system of the present invention. For the purposes of presenting a brief and clear description of the present invention, the preferred embodiment will be discussed as used for remotely deploying marker flags to indicate obstacles or landmarks. The figures are intended for representative purposes only and should not be considered to be limiting in any respect.

Referring now to FIG. 1, there is shown a perspective view of the marker assembly of the present invention in a deployed state. The assembly comprises a cylindrical housing 16 that supports an elongated marker 11 therein. The marker 11 includes an elongated length 12 such that when deployed, the marker 11 extends upwards from the housing 16 for visualization thereof. The marker 11 is concentric with the housing 16 and is retained therein when deployed as shown. The length of the housing 16 is substantially the length 12 of the marker 11 or is longer to accommodate a coil spring 15 connected to the lower end 14 of the marker 11.

The coil spring 15 biases the marker upwards into a deployed state as shown in FIG. 1, whereby the lower end 14 of the marker 11 abuts against the upper portion of the housing 16. The marker 11 is axially slidable within the housing 16, whereby the spring 15 is compressed when the marker 11 is pressed into the housing 16 and into a stowed state. A solenoid latch within the housing 16 secures the marker in the stowed state, whereby the spring 15 is compressed and has stored potential energy pending release from the solenoid latch therein. The spring 15 is connected to the base 10 of the housing 16 at one end, and to the lower end 14 of the marker 11 at a second end. Upon release of the solenoid latch, the marker is thrust upward and into a deployed state.

In its deployed state, a majority of the length 12 of the marker 11 is exposed from the housing 16 and is readily visible from a distance. This allows the marker to be useful in operably identifying objects adjacent to the marker assembly, such as a sprinkler head 20 as shown in FIG. 1. The upper end 13 of the marker 11 may include a flag, a bulb, or another adornment to assist with visualization, or alternatively the upper end 13 may be configured simply to seal the upper end of the housing 16 when the marker 11 is stowed therein.

In an exemplary embodiment and as provided in FIG. 1, the marker assembly may be connected to a sprinkler head housing 20. The marker housing 16 can be adjacent to the sprinkler head housing or be integrated thereinto, whereby sufficient volume is provided for the marker assembly and the solenoid latch. A movable sprinkler head 21 is deployed from a sprinkler head housing 20, which is in liquid communication with a water conduit 22 below the sprinkler head 21. It is contemplated that the present invention can be designed into the housing of the sprinkler head, or alternatively be deployed adjacent to the sprinkler head housing 20 as a standalone structure. The elements of the present marker assembly remain the same, apart from the shape and design of the supporting housing.

Figure 2:
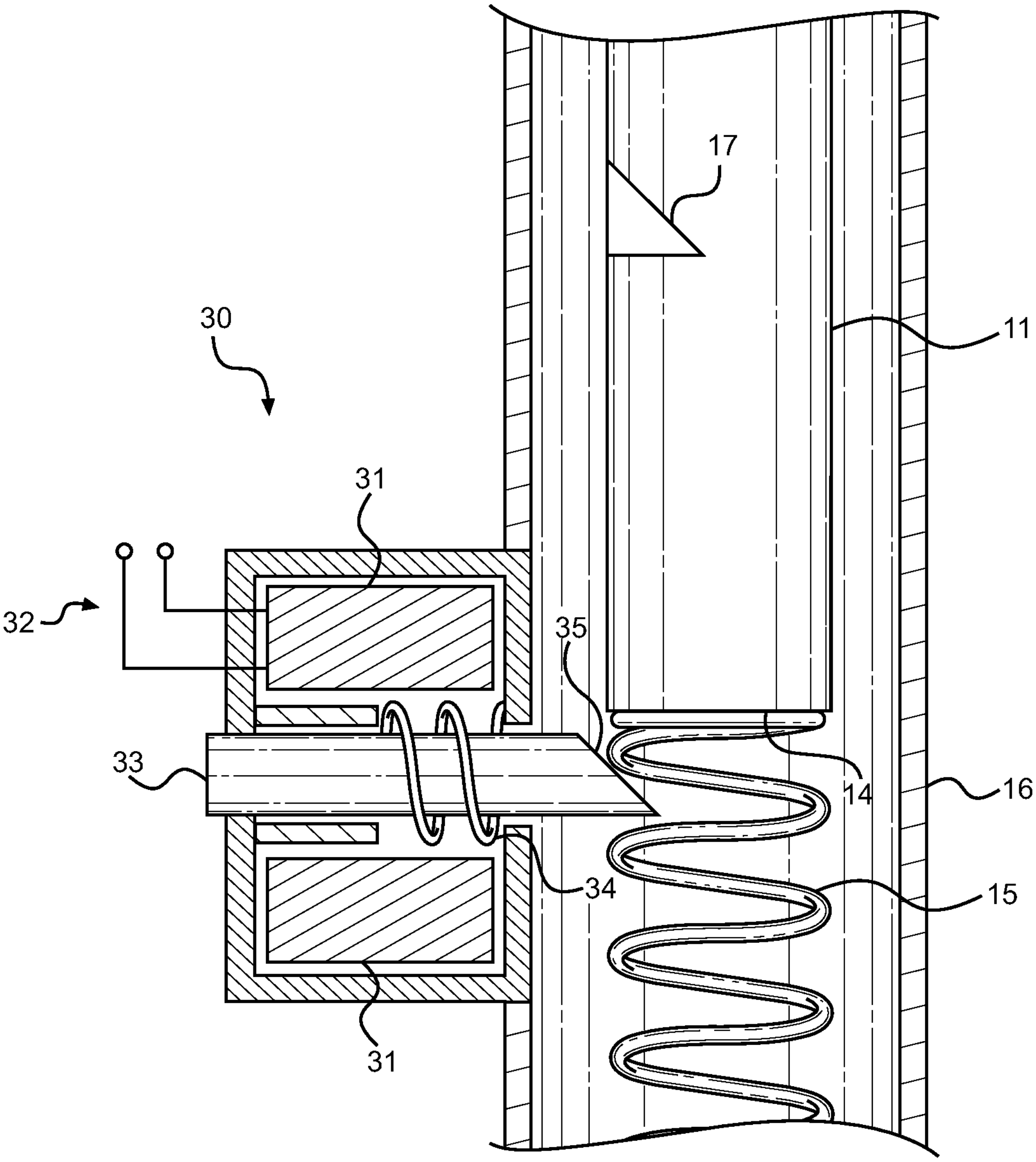
FIG. 2 shows a close-up view of the solenoid latch and the base of the spring-biased marker flag of the marker assembly.

Referring now to FIG. 2, there is shown a view of the solenoid latch 30 of the present invention and the connection between the latch and the marker 11. The solenoid latch 30 comprises a coil winding 31 and a spring biased plunger 33. Electrical connections 32 supply current to the coil winding 31, which creates a magnetic field. The plunger 33 includes an iron core and translates linearly when the magnetic field of the coil winding 31 is induced. The linear movement acts against the spring 34, which biases the plunger 33 into the interior of the marker housing 16. Therefore, the solenoid 30, when activated withdraws the plunger 33 from the marker housing 16 and imparts potential energy into the spring 34. When current ceases to flow through the coil winding 31, the spring 34 imparts energy onto the plunger 33 such that it is forced into the housing 16 interior.

The plunger 33 includes a distal end 35 that is configured to be inserted into the housing 16 and engage the marker 11 when the marker 11 is in a stowed state, thereby securing the marker 11 within the marker housing 16. The plunger engages a notch 17 along the sidewall of the marker 11, whereby the distal end 35 of the plunger 33 inserts into the cross section of the marker 11 and can effectively lock the marker in place when the notch 17 and plunger 33 are aligned. The plunger 33 inserts into the notch 17 such that the spring 15 below the marker 11 is compressed and includes stored potential energy. The plunger 33 is spring biased to advance into the housing 16 and engage the notch 17 when the marker 11 is pressed downward. When the two align, the distal end 35 of the plunger 33 inserts into the notch 17 and locks the two in a static state. When the solenoid 30 is activated, the plunger 33 is withdrawn from the housing 16 and withdrawn from the notch 17, thereby allowing the spring 15 to expand and force the marker 11 into an elevated state, whereby the spring 15 extends until the lower end 14 of the marker 11 abuts against the upper portion of the housing 16.

In one embodiment, the distal end 35 of the plunger 33 is a chamfered end, whereby the lower surface of the plunger extends into the housing 16 farther than the upper surface. The distal end 35, as shown in FIG. 2, allows the plunger to more readily engage the notch 17, also illustrated in FIG. 2. This configuration also facilitates locking the marker 11 in place once the two engage one another. More specifically, the angled end (chamfered) facilitates a user pressing down on the marker 11 and simultaneously causing the spring biased plunger 33 of the solenoid to retract into the solenoid. The distal end 35 is pressed by the lower end 14 of the marker, which causes the plunger 33 to move out of the housing 16 as the marker advances downward. This configuration facilitates resetting of the marker into the housing, while moving the solenoid plunger at the same time and in a manual operation.

The distal end 35 of the plunger 33 is contacted by an edge of the lower end 14 of the marker 11. An outer edge thereof contacts the distal end 35 of the plunger 33 at its distal end. The contact point between the lower edge of the marker and the distal end 35 slides, as the marker is pressed downward and the distal end 35 translates this into linear motion of the plunger 33. The linear motion moves the plunger 33 out of the path of the marker 11 as it is pressed into the housing 16, whereby the plunger 33 is withdrawn into the solenoid 30 and the plunger spring 34 is loaded with potential energy. This loading may be in the form of spring compression or tension, depending on the configuration of the spring 34 relative to the internals of the solenoid 30.

Figure 3:
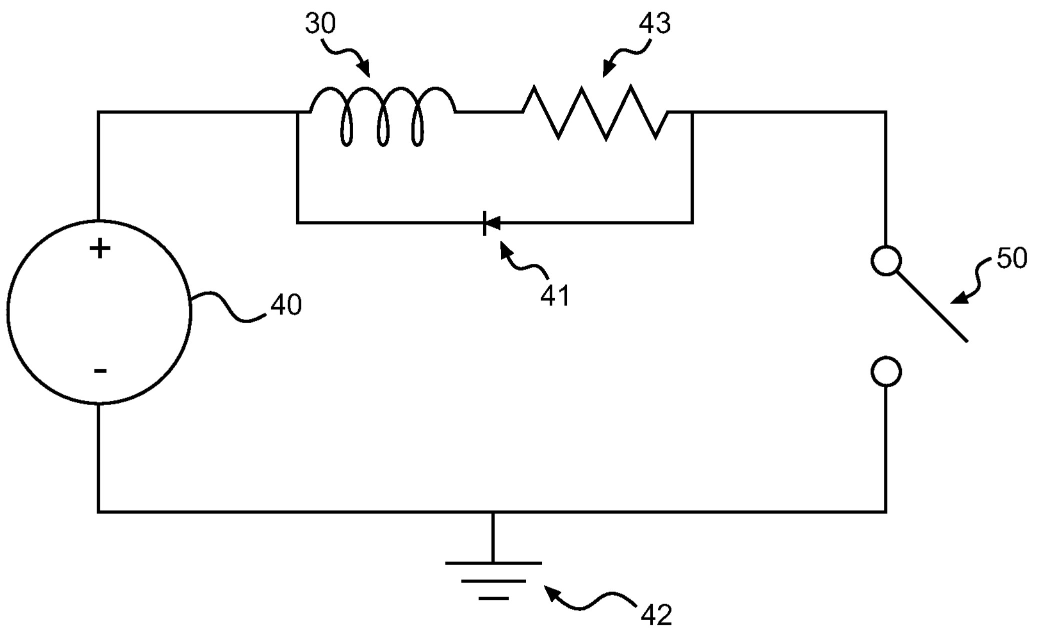
FIG. 3 shows an embodiment of the solenoid switch circuit.

Referring to FIG. 3, there is shown a contemplated solenoid control circuit that is wirelessly activated. The system includes a battery power source 40, the solenoid coil 30 (inductive), a resistor 43, a flyback diode 41, a solenoid switch 50, and a ground connection 42. When the switch 50 is closed, current runs from the power source 40 and into the solenoid coil 30, which develops the electromagnetic field used to withdraw the plunger from the marker housing and release the marker. When the switch 50 is open, the flyback diode 41 prevents spikes in voltage through the system, and the solenoid coil 30 is not generating the electromagnetic field necessary to impart motion on the plunger.

Figure 4:
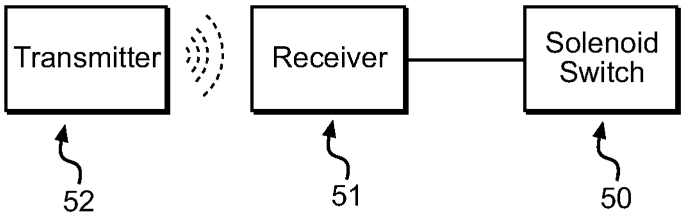
FIG. 4 shows a view of the transmitter/receiver system used to activate the solenoid switch.

Referring to FIG. 4, there is shown a diagram of the transmitter 52 and its activation of the solenoid switch 50. It is desired to provide remote activation of the marker, whereby a user does not have to manually deploy a marker flag and survey the property to locate each flag. Rather, the present invention provides a wireless transmitter 52, which sends out a radio signal to a wireless receiver 51 disposed within the marker assembly. The wireless receiver 51 is in electrical communication with the solenoid switch 50 such that receipt of an appropriate radio signal from the transmitter 52 closes the solenoid switch 50 and thereby releases the marker from the marker assembly.

Once released, the marker spring lifts the marker from its housing and positions the marker in an elevated state. The marker housing is generally buried in the ground with its upper end at the surface. The marker flag lifts above the ground surface such that the marker is readily visible when landscaping or otherwise noting the location thereof. The transmitter 52 allows remote deployment of the marker. To return the marker to into the housing, the user can simply locate the marker and step onto the marker, thereby pressing the same into the marker housing, compressing its spring, and joining the marker with the solenoid latch to lock the marker therein.

It is submitted that avoiding hidden sprinklers and other objects on a lawn when mowing or aerating the same can be difficult, even with multiple people working together. It can be very time consuming to locate the individual sprinkler heads and other obstacles to the avoided, and the risk of damaging property or lawn equipment is an unwanted risk. In addition to sprinklers, workers may accidentally hit buried phone, electrical, water, gas, or sewage pipe lines, which can result in damaged equipment and potential injury. The present invention allows a marker assembly to be deployed in those locations, and thereafter operably deploy a marker flag upon activation of a wireless transmitter, which elevates the flags across a lawn. The flags can be permanently deployed at known obstacles, remotely activated, and then manually stowed.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A marker flag system, comprising:
a wireless transmitter;
a marker flag assembly comprising:
an elongated marker supported within a marker housing, said elongated marker having an upper end and a lower end;
said marker housing supporting said elongated marker therein, said marker housing having a lower portion and an open upper portion;
a marker spring connecting said lower end of said elongated marker to said lower portion of said marker housing and biasing said elongated marker through said open upper portion of said marker housing;
a solenoid latch comprising a solenoid plunger, a plunger spring, and a coil winding;
said solenoid plunger configured to be biased by said plunger spring toward said elongated marker when said elongated marker is within said marker housing;
said solenoid plunger having a distal end configured to engage a notch along said elongated marker when said elongated marker is disposed within said marker housing and said marker spring is compressed;

said latch further comprising a power source and a solenoid switch that allows current to flow to said coil winding when said solenoid switch is closed;

a wireless receiver in electrical communication with said solenoid switch;

said wireless transmitter configured to send a signal to said wireless receiver, and said wireless receiver configured to close said solenoid switch upon receipt of said signal.

2. The marker flag system of claim 1, wherein:

said solenoid plunger further comprises a distal end;

said distal end further comprising a chamfered edge configured to receive an edge of said lower end of said elongated marker when said elongated marker is pressed downward into said marker housing;

said edge of said lower end of said elongated marker causing said chamfered edge to slide along said edge and said solenoid plunger to translate away from said elongate marker and such that said plunger spring is loaded with potential energy.

3. The marker flag system of claim 1, wherein:

said solenoid plunger further comprises a distal end;

said distal end further comprising a chamfered edge configured to receive an edge of said lower end of said elongated marker when said elongated marker is pressed downward into said marker housing;

said edge of said lower end of said elongated marker causing said chamfered edge to slide along said edge and said solenoid plunger to translate away from said elongate marker and such that said plunger spring is loaded with potential energy;

said notch in said elongated marker configured to receive said chamfered edge of said solenoid plunger.

* * * * *